United States Patent [19]

Munch

[11] Patent Number: 4,634,108
[45] Date of Patent: Jan. 6, 1987

[54] RESILIENT BEARING WITH A POSITIVE GUIDANCE

[75] Inventor: Gunter Munch, Damme, Fed. Rep. of Germany

[73] Assignee: Lemförder Metallwaren AG, Fed. Rep. of Germany

[21] Appl. No.: 683,933

[22] Filed: Dec. 20, 1984

[30] Foreign Application Priority Data

Dec. 23, 1983 [DE] Fed. Rep. of Germany ....... 3346665

[51] Int. Cl.⁴ ............................................. B60G 11/18
[52] U.S. Cl. .............................. 267/57.1 R; 267/63 R
[58] Field of Search ............. 267/21 R, 57.1 R, 63 R, 267/63 A, 57.1 A, 152, 153, 140.2, 141, 141.2; 384/582; 248/609; 403/225

[56] References Cited

U.S. PATENT DOCUMENTS

| | | | |
|---|---|---|---|
| 3,464,716 | 9/1969 | Butler | 267/63 R X |
| 3,666,301 | 5/1972 | Jorn | 267/57.1 R X |
| 3,907,122 | 9/1975 | Ksienysk et al. | 267/57.1 R X |
| 4,007,924 | 2/1977 | Jorn et al. | 267/57.1 R |
| 4,109,979 | 8/1978 | Estaque | 267/57.1 R |

FOREIGN PATENT DOCUMENTS

| | | | |
|---|---|---|---|
| 0218070 | 3/1957 | Australia | 267/57.1 R |
| 0851868 | 10/1952 | Fed. Rep. of Germany | 267/57.1 R |
| 2838391 | 3/1980 | Fed. Rep. of Germany | |
| 1518317 | 2/1968 | France | 267/153 |

Primary Examiner—Douglas C. Butler
Assistant Examiner—Robert J. Oberleitner
Attorney, Agent, or Firm—McGlew and Tuttle

[57] ABSTRACT

A resilient bearing comprising a resilient body of an elastic material which is clamped between an outer sleeve and an inner sleeve and provided at both its frontal sides with cavities reaching inside up to the center of the bearing and being angularly offset relative to each other. In the zones of solid material, the resilient body is prestressed so that upon deflections in any direction, the parts are positively returned to their initial mutual position.

6 Claims, 8 Drawing Figures

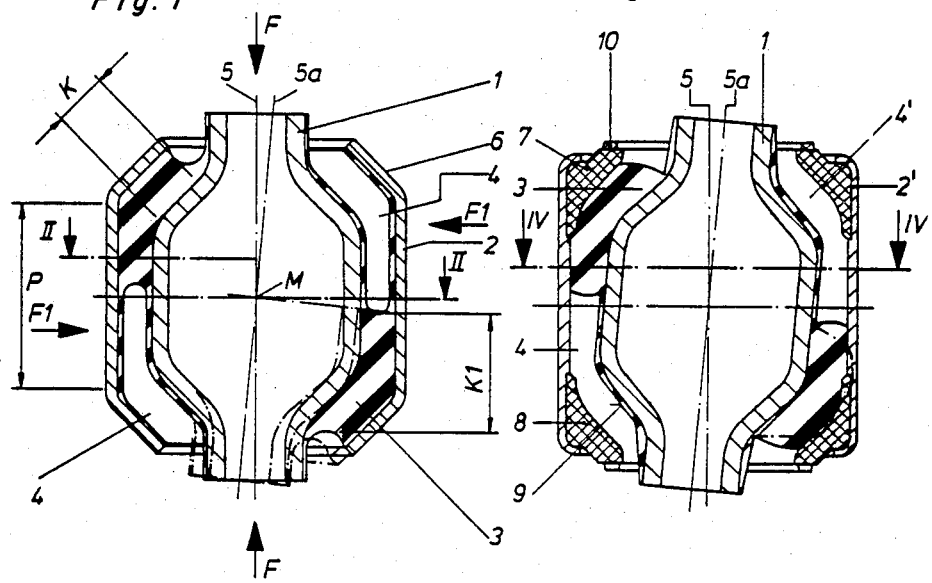
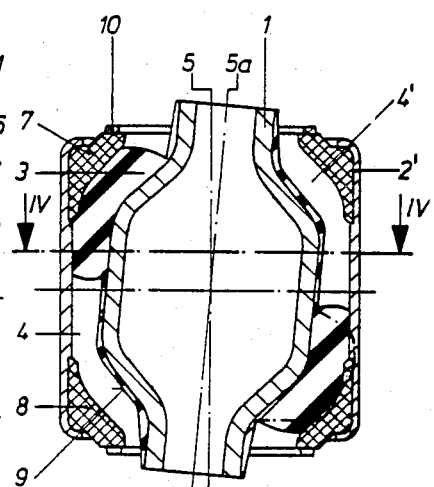
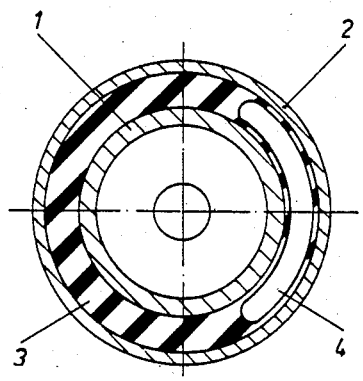
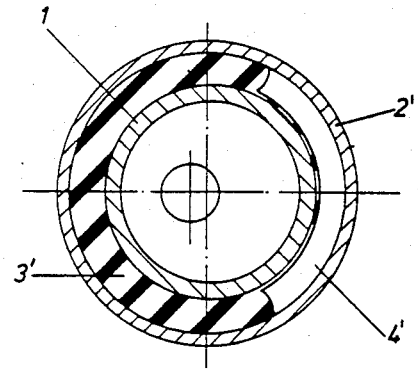

RESILIENT BEARING WITH A POSITIVE GUIDANCE

FIELD AND BACKGROUND OF THE INVENTION

This invention relates in general to bearings and in particular to a new and useful resilient bearing construction employing inner and outer metallic sleeves and an intermediate elastic material therebetween.

Bearings of this kind are intended particularly for pivoting the radius arm of motor vehicles. Such a bearing must take up by its resilient body shearing forces produced by the oscillatory movements of the wheels and compensate for vibrations caused at the apparently constant speed of the vehicle. The bearing, however, is also to control the roll steer effect of the vehicle while negotiating and with a varying load, to counteract the tendency of oversteering. One bearing of this kind is known from German OS No. 28 38 391. In this prior art design, a rubber body is clamped between an outer and an inner metallic sleeve and bonded thereto by vulcanization. To obtain the sought positive guidance of the universal movements under load, the walls of the two sleeves enclosing the rubber body taper obliquely to the axis of the bearing, so that under acting axial forces, the sleeves are positively radially displaced relative to each other in a predetermined direction. With a corresponding adjustment of the joints of the two radius arm members, this may ensure the desired pivoting of the members. To obtain this effect, this prior art design requires irregular shapes of the metallic sleeves and of the rubber body, or even a plurality of such irregular rubber bodies in a single bearing. The result is that a bearing having a specific shape and a relatively large size must be provided in every specific application.

SUMMARY OF THE INVENTION

The invention is directed to a bearing preserving the advantages of the prior art, which is improved to have a minimum size, is inexpensive in large series manufacture while having variable dimensions for varial loads, and is easy to assemble and requires no maintenance.

In accordance with the invention, a resilient bearing comprises an outer sleeve and an inner sleeve disposed with at least a central part thereof within the outer sleeve. The resilient body of elastic material is clamped between the outer and inner sleeves in an arrangement in which it is arranged for positively guiding universal deflective movements. The resilient body has an initial shape so that it has substantially cylindrical outer and inner surfaces angularly offset so as to define cavities at respective opposite sides and ends which reach down to the longitudinal central plane of the bearing. Zones of solid material of the body are aligned at opposite sides of the inner sleeve and the resilient body is prestressed when it is connected.

The starting stock for manufacturing an inventive bearing are substantially cylindrical tubular bodies for the outer sleeve and the inner sleeve, and an initially also substantially cylindrical resilient body of an elastic material, which is simple to manufacture in a simple mold. Therefore, prior to the assemblage, the walls of the cavities also extend cylindrically relative to the axis. The cavities may be designed as blind holes, or they may be open at the outer circumference of the resilient body, which is another simplification of their manufacture. The prestressing of the resilient body in its solid portions may be obtained by calibrating the outer sleeve and additionally tapering its ends. This brings the inner sleeve into a tilted position relative to the longitudinal axis and about the geometrical center, while later, in mounted position in the vehicle, the sleeve is brought into alignment again whereby a desired prestressing is produced. Instead of calibrating and tapering, shaped tapering rings may be provided which are axially pressed into the end portions of the outer sleeve, as is known per se from prestressing elastomeric bodies. A substantial advantage is that the inventive bearing ensures a better distribution of stresses and this extends the life of the elastic material.

Accordingly, it is an object of the invention to provide a resilient bearing in which an inner sleeve member is arranged with an outer sleeve member and is prestressed by an annular elastic material body which has an encircling band of solid material disposed at an angle to the axis of the sleeve members.

A further object of the invention is to provide a resilient bearing with a positive guidance and which includes a resilient body holding an inner sleeve within an outer sleeve and arranged so that the inner sleeve is prestressed.

A further object of the invention is to provide a bearing which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view of a resilient bearing, taken in the plane of the longitudinal axis and constructed in accordance with the invention;

FIG. 2 is a cross-section taken along the line II—II of FIG. 1;

FIG. 3 is a view similar to FIG. 1, of another embodiment of the invention;

FIG. 4 is a cross-section taken along the line IV—IV of FIG. 3;

DESCRIPTION OF THE PREFERRED EMBODIMENTS

Figures 5, 7:
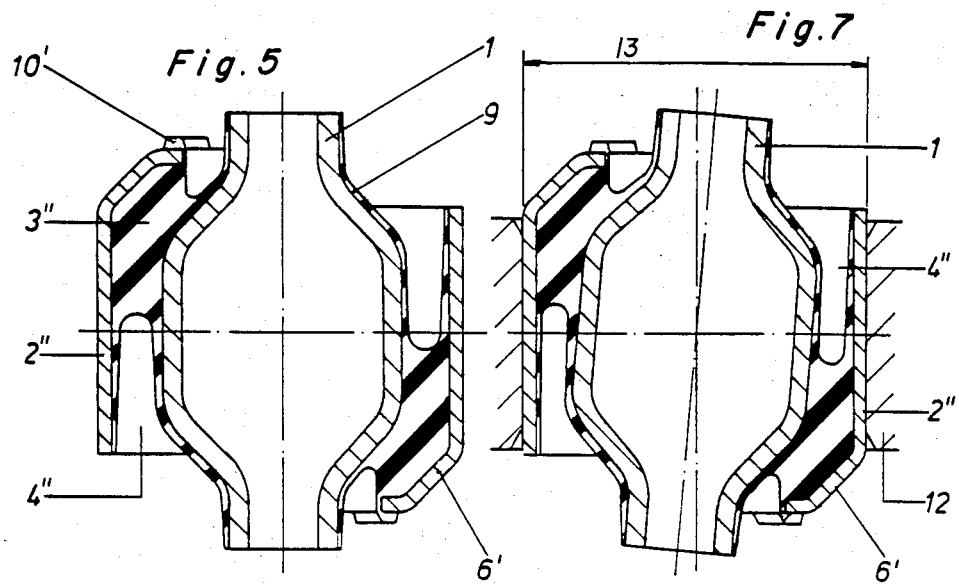
FIG. 5 is a longitudinal section of another embodiment of the invention.
FIG. 7 is a longitudinal section corresponding to FIG. 5, with the inner sleeve being shown in its initial position.

Referring to the drawings in particular, the invention embodied in FIGS. 1 and 2, comprises an outer sleeve 2 arranged over an inner sleeve 1 and with an elastic material 3 clamped therebetween which is of annular configuration and includes solid parts which extend at an angle to the axis 5 of the bearing. The two sleeves and 2 are made preferably of steel. The resilient body 3 is made of rubber or a plastic having comparable properties. Depending on the design, resilient body 3 may be firmly bonded, such as vulcanized, to the outer surface of inner sleeve 1 and the inner surface of outer sleeve 2. To obtain that under load F in the axial direction, the inner sleeve 1 is tilted out of its axial position centered on axis 5 to a position centered on tilted axis 5a, the resilient body 3, which initially has a cylindrical outer surface is provided with cavities 4 which extend from either of its ends axially toward the inside, up to the lengthwise central plane of the bearing. Cavities 4 are arranged in offset positions at the two ends of body 3, and the corresponding solid portions aligned therewith at the same ends of the body and indicated K in FIG. 1, are prestressed in their mounted state. In the embodiments of FIGS. 1 and 2, cavities 4 are designed as blind recesses having substantially cylindrical surfaces, with their bottom about in the central plane of the bearing. In the embodiment of FIGS. 1 and 2, the prestressing is obtained due to a calibration of the outer sleeve 2 and the subsequent compressing to tapers 6 in the zones indicated at K. In addition, inner sleeve 1 is provided with corresponding tapers at both sides or ends, so that the prestressing of the material therebetween is caused by two substantially parallel walls of sleeve 1 and sleeve 2. Under load in any of the axial directions, the shown symmetrical configuration of the bearing has the same effect. During the assemblage of the bearing, what is to be watched is only the correct angular position of the cavities 4 which are needed for the cadanic or universal deflection and extend through about 180° and to the center of the bearing. In FIG. 1 broken lines show the position of inner sleeve 1 before the mounting of the bearing. The solid lines of inner sleeve 1 show its axially aligned position after mounting the bearing. In the embodiment of FIGS. 3 and 4, the inner sleeve 1 is designed according to FIGS. 1 and 2. In the outer sleeve 2', shaped rings 7 and 8 are pressed in from the ends and held fast in the sleeve by flanges. Shaped rings 7 and 8 correspond to tapers 6 of the embodiment of FIGS. 1 and 2. FIG. 3 further shows that cavities 4' may be designed as recesses open to the outer circumference, so that only a hose-like portion 9 is aligned with the solid material portion of resilient body 3'. At the ends of the bearing, shaped rings 7 and 8 protrude from outer sleeve 2' to form a resilient stop ring 10, or they are connected to resilient annular segments. Shaped rings 7,8 are advantageously made of a solid material. In FIG. 3, inner sleeve 1 is shown in tilted position with its axis 5a extending obliquely to bearing axis 5, i.e. in an unloaded state, before mounting the bearing. The advantage of this embodiment of FIGS. 3, 4 is primarily that the resilient body 3' is firmly bonded only to the inner sleeve 1, and the sleeve 2' need not be prepared for this purpose. The frictional adhesion between resilient body 3' and outer sleeve 2' is sufficient and is produced by the radial clamping of body 3' through rings 7, 8 alone.

Figures 6, 8:
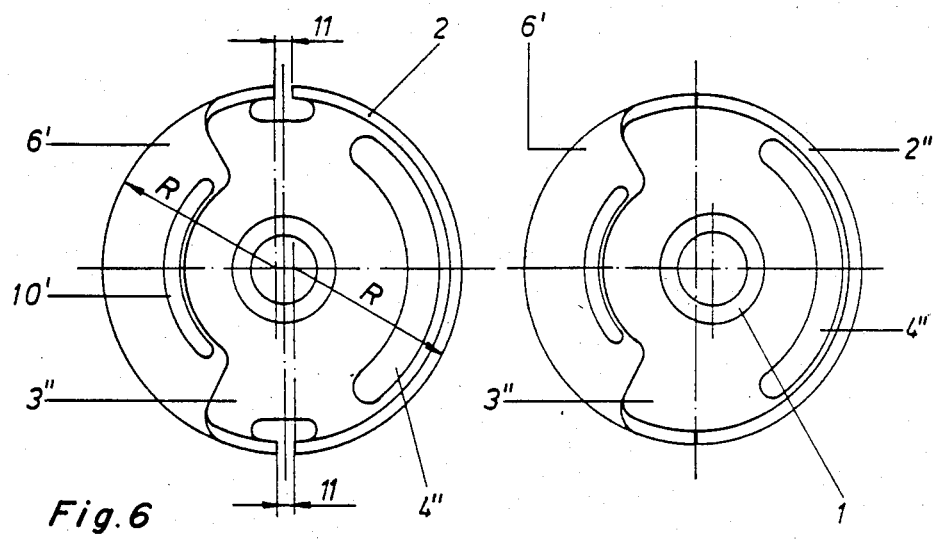
FIG. 6 is an end elevational view corresponding to FIG. 5.
FIG. 8 is an end elevational view corresponding to FIG. 7.

A particularly inexpensive embodiment is shown in FIGS. 5-8. In this design, the ends of outer sleeve 2' are stepped off, with the setback portions substantially covering the area of cavities 4" of resilient body 3". In the zones of the solid material of resilient body 3", the longer end portions of outer sleeve 2" are formed as in the embodiments of FIGS. 1 and 2. In addition, in this area, the end portions of resilient body 3" protrude from the sleeve 2" and are formed to resilient stop segments 10'. At two diametrally opposite locations, outer sleeve 2" is provided with compensation slots 11 permitting the forcing of the sleeve 2" into a bearing body and thus reduce its outer diameter. After the effected mounting to support 12, the gap formed by slots 11 is closed, as shown in FIG. 8. This gives the bearing sleeve 2" an outer diameter shown at 13 in FIG. 7.

While specific embodiments of the invention have been shown and described in detail to illustrate the application of the principles of the invention, it will be understood that the invention may be embodied otherwise without departing from such principles.

What is claimed is:

1. A resilient bearing having a central axis and comprising an outer sleeve, an inner sleeve forming a supporting tube having a central portion disposed within said outer sleeve, and an annular resilient body of elastic material clamped between said outer sleeve and said inner sleeve, said inner and outer sleeves have central axes aligned with said bearing central axis, said resilient body having an initial shape with substantially cylindrical outer and inner surfaces and having a pair of cavities therein which are offset from each other on opposite sides of said resilient body and at opposite ends of said resilient body, each cavity extending from one of said opposite ends to a longitudinal central plane of the bearing, and wherein said resilient body has zones of solid resilient material extending across said inner sleeve at respective opposite ends thereof from each of said cavities, said resilient body being prestressed, one cavity being provided at each end of said resilient body and said cavities being diametrically offset from each other and, in respect to the axial cross section of the bearing, said outer sleeve having an inwardly tapering wall portion at each end thereof, each wall portion prestressing said resilient body from the outside of the resilient body and wherein said inner sleeve includes an inwardly tapering wall portion at each end thereof extending parallel to one of the tapering wall portions of said outer sleeve, said inner sleeve, before said resilient body is prestressed, having its central axis extending obliquely to said bearing central axis in a direction away from each zone of solid resilient material and toward each cavity.

2. A resilient bearing according to claim 1, wherein said inner sleeve is enlarged in the longitudinal central zone of said bearing, said enlargment tapering off toward each end thereof.

3. A resilient bearing according to claim 1, wherein said resilient body is prestressed by said inner and outer sleeves in the zones of solid resilient material of said resilient body.

4. A resilient bearing according to claim 1, including a shaped rings disposed within each end of said outer sleeve and prestressing said resilient body.

5. A resilient bearing according to claim 4, wherein said shaped rings include resilient stop portions extending out of said outer sleeve at ends thereof.

6. A resilient bearing according to claim 5, wherein said stop are formed integrally with parts of said bearing.

* * * * *